United States Patent
Joshi et al.

(10) Patent No.: US 10,645,409 B2
(45) Date of Patent: May 5, 2020

(54) SUPER-RESOLUTION LOOP RESTORATION

(71) Applicant: GOOGLE LLC, Mountain View, CA (US)

(72) Inventors: Urvang Joshi, Mountain View, CA (US); Debargha Mukherjee, Cupertino, CA (US); Andrew Simpson, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/018,105

(22) Filed: Jun. 26, 2018

(65) Prior Publication Data
US 2019/0394482 A1 Dec. 26, 2019

(51) Int. Cl.
| | |
|---|---|
| H04N 7/01 | (2006.01) |
| H04N 19/50 | (2014.01) |
| H04N 19/117 | (2014.01) |
| H04N 19/184 | (2014.01) |
| H04N 19/61 | (2014.01) |
| H04N 19/176 | (2014.01) |

(52) U.S. Cl.
CPC .......... *H04N 19/50* (2014.11); *H04N 7/0117* (2013.01); *H04N 19/117* (2014.11); *H04N 19/176* (2014.11); *H04N 19/184* (2014.11); *H04N 19/619* (2014.11)

(58) Field of Classification Search
CPC .... H04N 19/50; H04N 19/117; H04N 19/176; H04N 19/184; H04N 19/619; H04N 7/0117
See application file for complete search history.

(56) References Cited

U.S. PATENT DOCUMENTS

2019/0052911 A1* 2/2019 Zhang .................... H04N 19/82

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.

(Continued)

*Primary Examiner* — Tsion B Owens
(74) *Attorney, Agent, or Firm* — Young Basile Hanlon & MacFarlane, P.C.

(57) ABSTRACT

Systems and methods are disclosed for encoding and decoding video. For example, methods may include accessing an encoded bitstream; decoding loop restoration parameters in the encoded bitstream; after reconstruction of an image at a second resolution based on data of the encoded bitstream, upscaling the reconstructed image to obtain an upscaled reconstructed image at a first resolution, wherein the second resolution is less than the first resolution in at least one dimension; and applying loop restoration filtering to the upscaled reconstructed image using the loop restoration parameters to obtain a loop restored image at the first resolution.

20 Claims, 11 Drawing Sheets

(56) References Cited

OTHER PUBLICATIONS

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

\* cited by examiner

SUPER-RESOLUTION LOOP RESTORATION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on spatial similarities may be performed by breaking a frame or image into blocks that are predicted based on other blocks within the same frame or image. Differences (i.e., residual errors) between blocks and prediction blocks are compressed and encoded in a bitstream. A decoder uses the differences and reference frames to reconstruct the frames or images. Prediction blocks may be determined in part by using loop filtering to suppress distortion occurring in reconstructed images.

SUMMARY

This application relates to encoding and decoding video or other images. Disclosed herein are aspects of systems, methods, and apparatuses for performing super-resolution loop restoration for an image (e.g., a frame of video). In some implementations, upscaling to super-resolution is performed in a horizontal dimension, but not in a vertical dimension.

One aspect of the disclosed implementations is a system for encoding video. The system includes a memory and a processor. The memory stores instructions executable by the processor to cause the system to: access an image at a first resolution; determine loop restoration parameters based on the image; downscale the image to obtain a downscaled image at a second resolution, wherein the second resolution is less than the first resolution in at least one dimension; encode the downscaled image in an encoded bitstream; encode the loop restoration parameters in the encoded bitstream; after reconstruction of the image at the second resolution based on data of the encoded bitstream, upscale the reconstructed image to obtain an upscaled reconstructed image at the first resolution; and apply loop restoration filtering to the upscaled reconstructed image using the loop restoration parameters.

Another aspect is a method for decoding video. The method includes: accessing an encoded bitstream; decoding loop restoration parameters in the encoded bitstream; after reconstruction of an image at a second resolution based on data of the encoded bitstream, upscaling the reconstructed image to obtain an upscaled reconstructed image at a first resolution, wherein the second resolution is less than the first resolution in at least one dimension; and applying loop restoration filtering to the upscaled reconstructed image using the loop restoration parameters to obtain a loop restored image at the first resolution.

Another aspect is a system for decoding video. The system includes a memory and a processor. The memory stores instructions executable by the processor to cause the system to: access an encoded bitstream; decode loop restoration parameters in the encoded bitstream; after reconstruction of an image at a second resolution based on data of the encoded bitstream, upscale the reconstructed image to obtain an upscaled reconstructed image at a first resolution, wherein the second resolution is less than the first resolution in at least one dimension; and apply loop restoration filtering to the upscaled reconstructed image using the loop restoration parameters to obtain a loop restored image at the first resolution.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
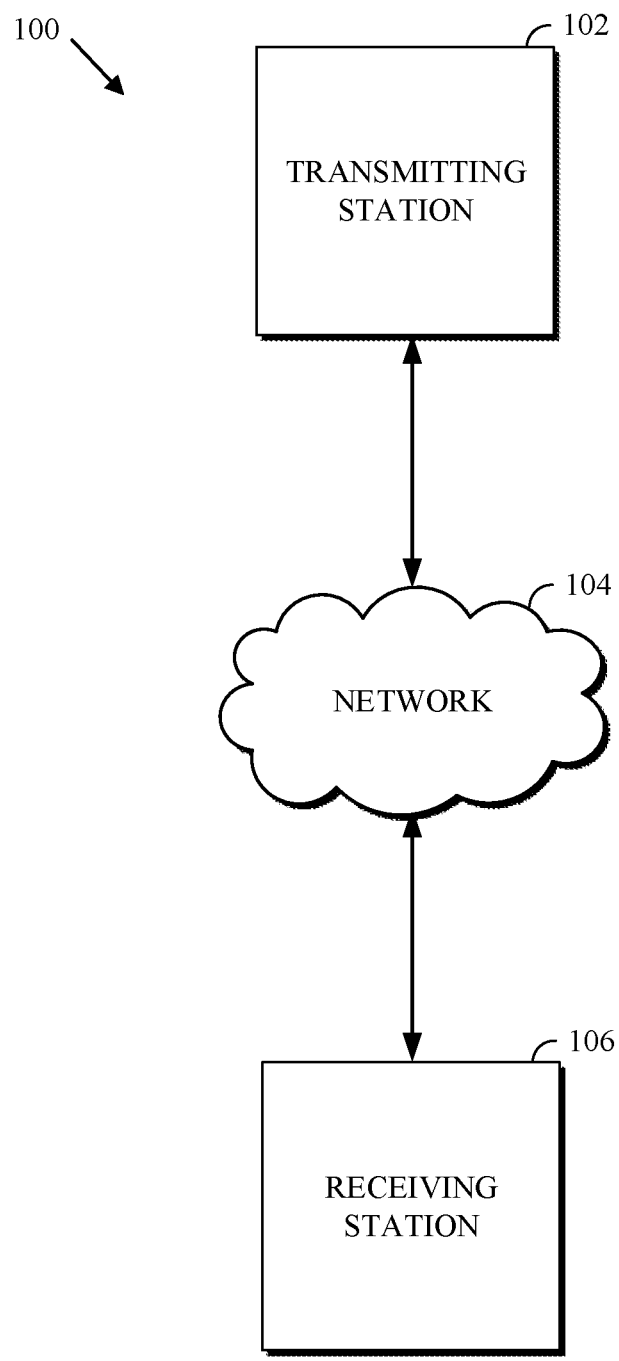
FIG. 1 is a schematic of a video encoding and decoding system.

A new framework for scaling an image (e.g., a frame of video or a still image) using super-resolution is proposed. Images may be coded at lower resolution, then upscaled to a full resolution before updating references. Losses in image quality caused coding with a codec can be recovered using loop restoration parameters sent in the bitstream. The framework may be useful to improve the visual quality at low-bitrate settings.

Video streaming services may adaptively switch the frame resolution based on current bandwidth. For example, when available bandwidth is low, they may send lower resolution frames, and then upscale them to the display device resolution. However, such a scaling typically occurs outside of the video codec. Some implementations of this new framework for super-resolution loop restoration may make this scaling process more effective by making it a part of the codec itself. Another potential use-case of this framework is to support spatial scalability mode.

The new framework (e.g., the framework 600 of FIG. 6) for frame super-resolution loop restoration can perform better than coding at full-resolution, especially at low bitrates, in terms of perceptual metrics. This framework may also provide an extra parameter to the encoder for rate/complexity control, in addition to the quantization factor. The existing frame scaling mode (without frame super-resolution) may continue to be used alongside the new framework as an alternative to be selectively applied. In other words, one of these image scaling modes by itself or both modes together may be used as appropriate. In some implementations, image super-resolution loop restoration performs scaling only in the horizontal direction to be hardware friendly—for example, to avoid extra line buffer requirements.

An example of a decoding an image (e.g., a frame of video) using the new framework for super-resolution loop restoration is as follows: decode image width (W) and height (H) fields; set superres_used=<read 1 bit from bitstream>; if superres used==1, then superres denominator d=9+<read 3 bit value from bitstream>, else superres denominator d=8; actual coded width Wc=Round_up_to_even(W*8/d); actual coded height Hc=H; decode the image of size Wc×Hc, including deblocking filtering and Constrained Directional Enhancement Filtering (CDEF); if superres_used==1, then linearly upscale the decoded image to size W×H (e.g., using an 8-tap up-scaler); and perform loop restoration on the upscaled (W×H) image, using the loop restoration parameters sent in the bitstream. The final decoded image is of size W×H, which may be displayed and/or sent to a reference buffer.

This approach may have a number of advantages over other methods. For example, use of super-resolution loop-restoration filtering may result in improvements in terms of perceptual metrics like PSNR-HVS, MS-SSIM and VMAF, and also visual improvements on some sequences in objective-1-fast.

Details are described herein after first describing an environment in which the improved image processing for compression disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
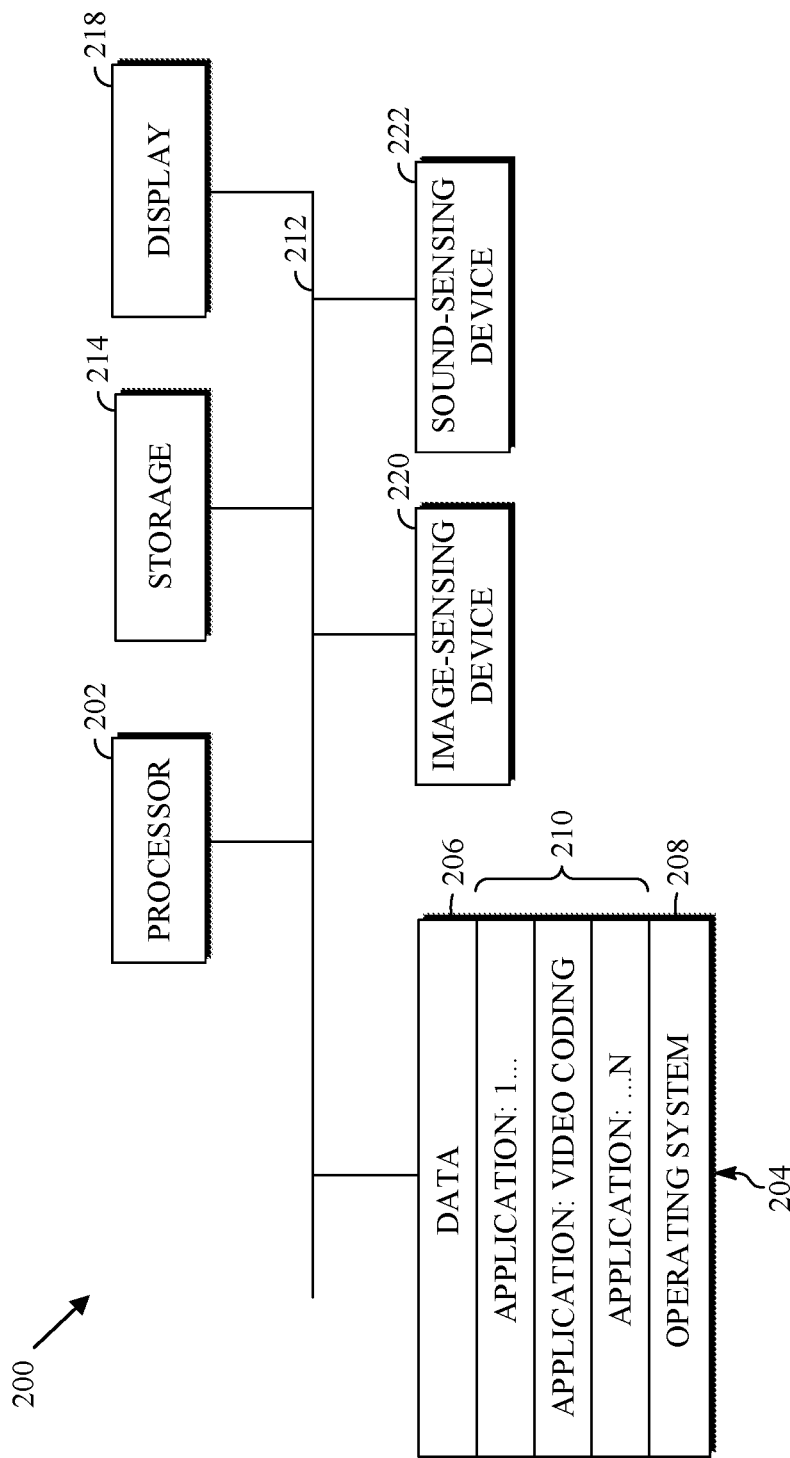
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
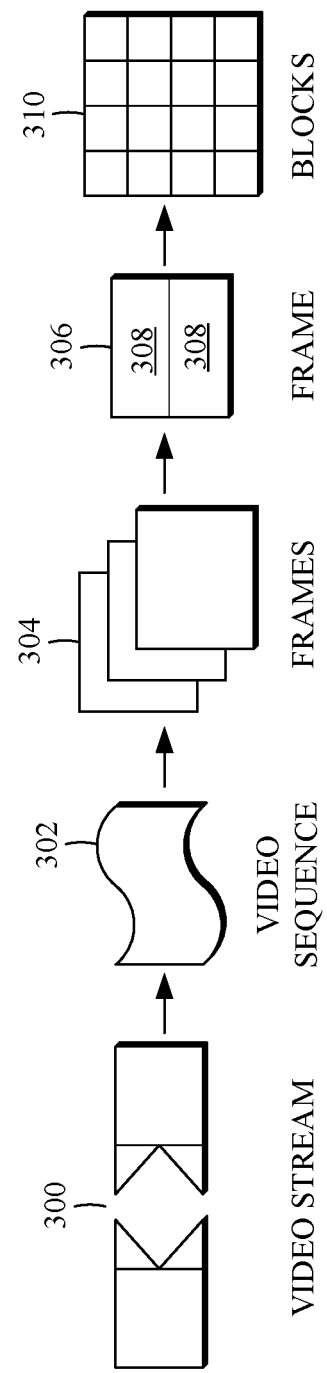
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. In some cases, a frame may be referred to as a picture. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, 4×32 pixels, 8×32 pixels, 16×32 pixels, 32×4 pixels, 32×8 pixels, 32×16 pixels, 32×32 pixels, 64×64 pixels, or in general N×M pixels, where N, M may be an integer power of 2 like 2, 4, 8, 16, 32, 64, 128, 256, or larger.

Figure 4:
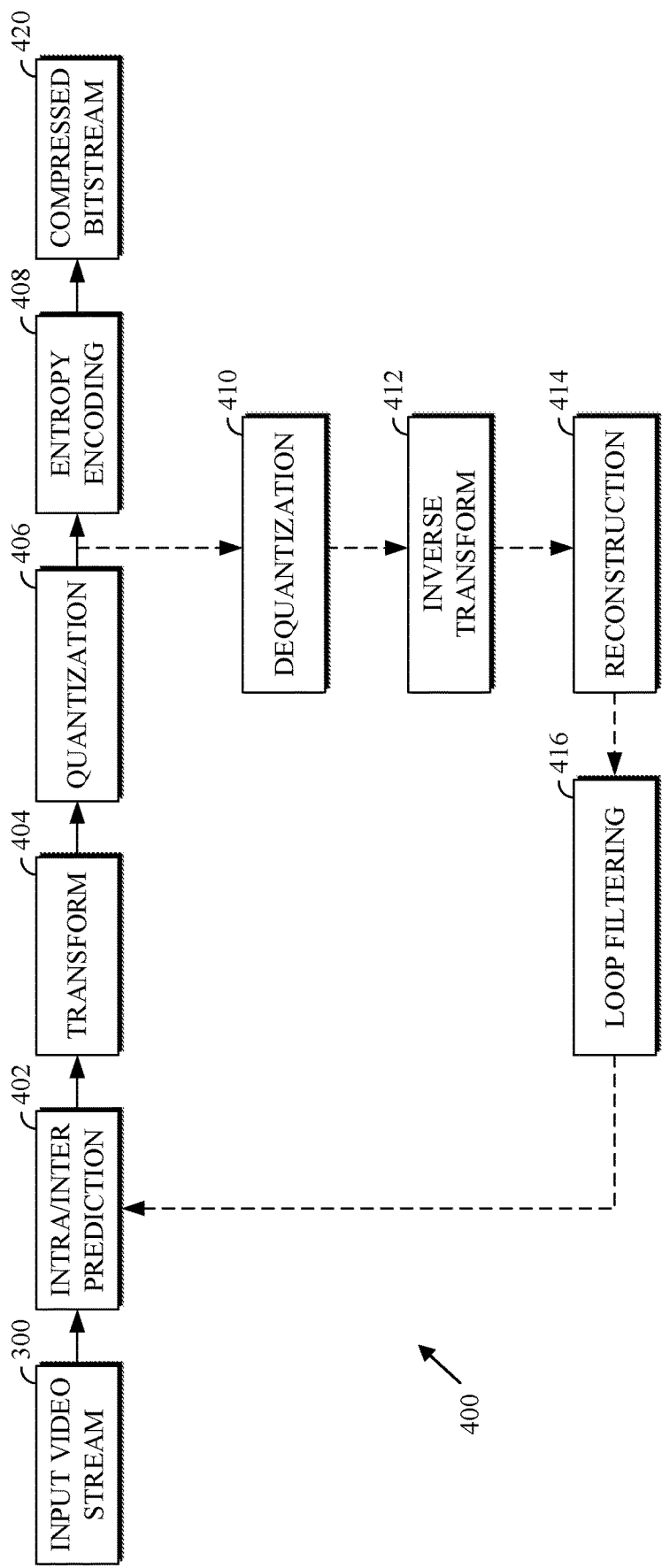
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms (e.g., identity transform, transpose, rotation, and Karhunen-Loeve transform (KLT)) are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts. For example, the loop filtering stage 416 may apply loop restoration filtering to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
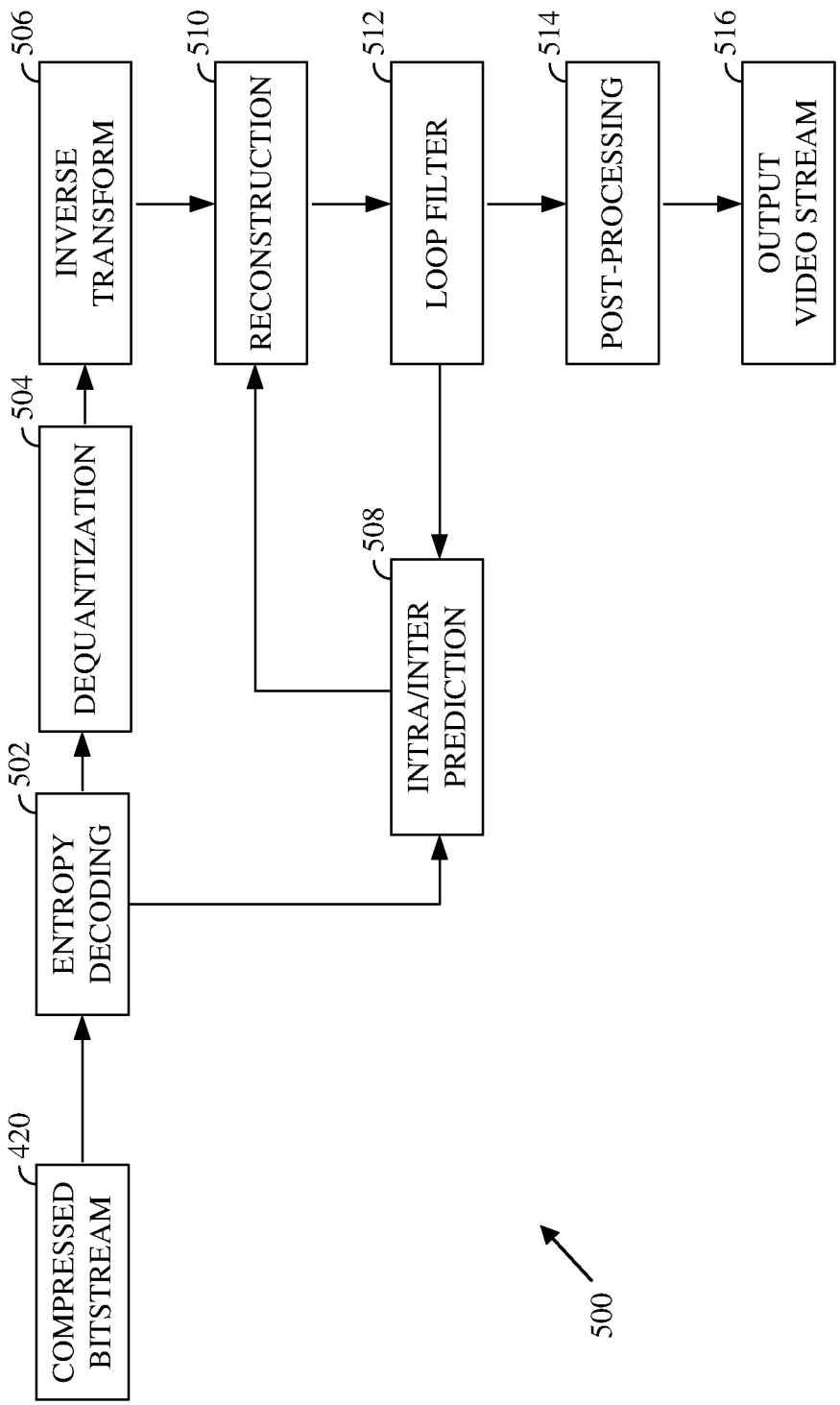
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post-processing stage 514 (e.g., including deblocking filtering). Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. In some implementations, the loop filtering stage 512 may apply the loop restoration filtering to the reconstructed block to reduce distortion such as blocking artifacts. Other filtering can be applied to the reconstructed block. In this example, the deblocking filtering is applied by the post-processing stage 514 to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post-processing stage 514. In some implementations of the decoder 500, the post-processing stage 514 (e.g., including deblocking filtering) is applied before the loop filtering stage 512. Additionally, or alternatively, the encoder 400 includes a deblocking filtering stage in addition to the loop filtering stage 416.

Figure 6:
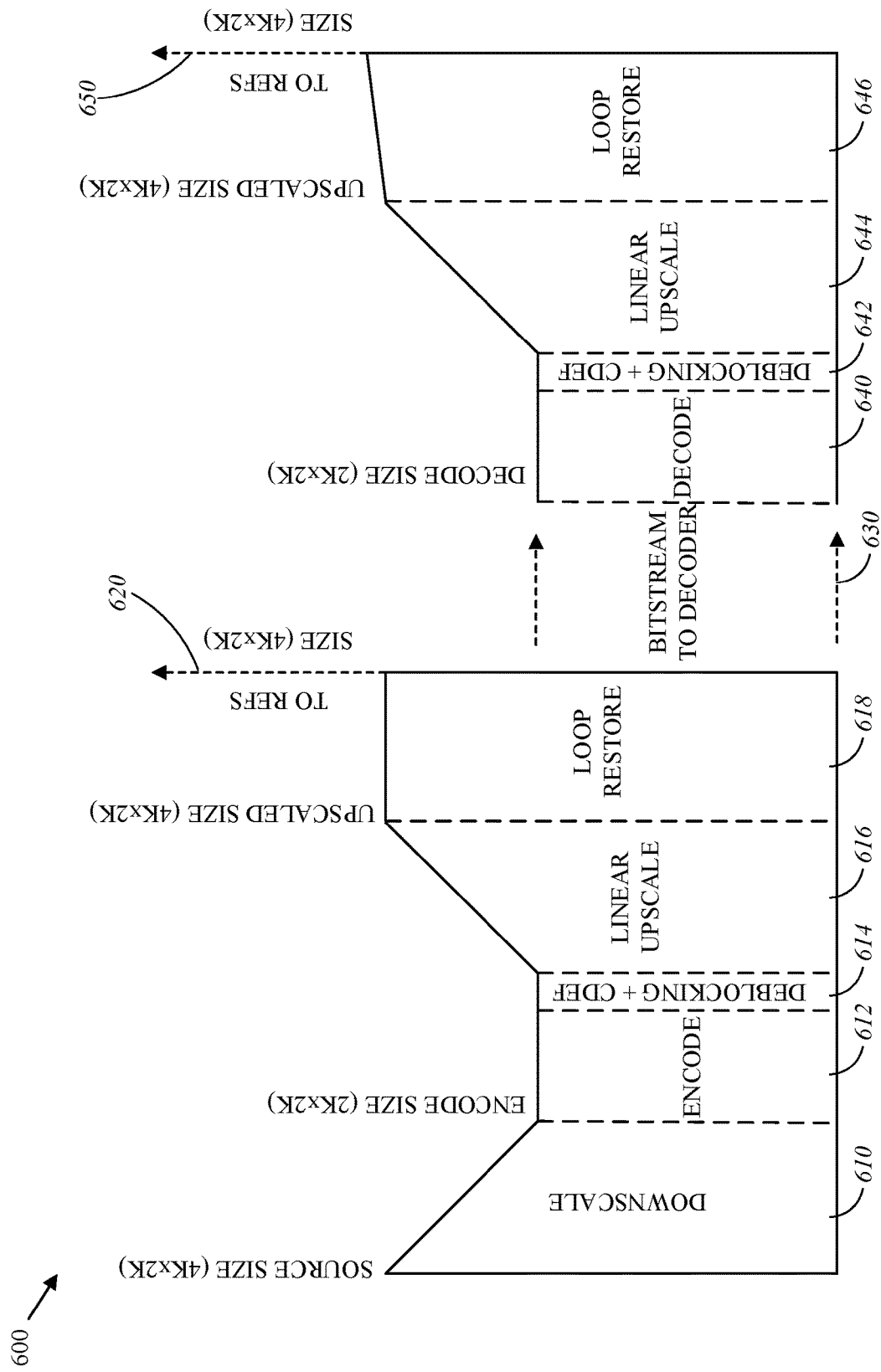
FIG. 6 is an illustration of an example of a framework for super-resolution loop restoration.

FIG. 6 is an illustration of an example of a framework 600 for super-resolution loop restoration. The framework 600 is annotated with the frame resolution at different stages for an example source frame of size 4K×2K, with a down-scaling ratio of 1/2 for the horizontal dimension. Loop restoration parameters may be selected for the source image, taking into account information available in the full resolution input image. At stage 610 a source image (e.g., a frame of video) of size 4K×2K is subject to a downscale operation to obtain an image at an encode resolution of 2K×2K. This downscaled image is then encoded at stage 612. For example, the encoding performed at stage 612 may include performing intra-frame prediction and/or inter-frame prediction, transforming residual blocks, quantizing transform coefficients, and applying entropy coding to the quantized transform coefficients and/or other parameters of the image, including loop restoration parameters for the super-resolution image, to generate an encoded bitstream. For example, encoding may be performed as described in relation to the encoder 400 of FIG. 4, operating at the encode resolution of 2K×2K. The resulting encoded image may be reconstructed for inter-frame prediction and subject to deblocking filtering and Constrained Directional Enhancement Filtering (CDEF) at stage 614. The reconstructed image is then linearly upscaled at stage 616 to the super-resolution, in this example to a size of 4K×2K. Loop restoration filtering (e.g., a Wiener filter or a self-guided restoration filter) is applied at stage 618 to the upscaled reconstructed image using the loop restoration parameters that were determined based on the full resolution source image and encoded in the bitstream. The resulting loop restored image 620 may be used for inter-prediction coding of one or more subsequent images (e.g., frames of video).

The encoded bitstream, including the loop restoration parameters, is conveyed to a decoder via a transmission and/or storage channel at stage 630. The encoded bitstream is decoded at stage 640 to recover the quantized residual blocks (at the encode resolution of 2K×2K) and the loop restoration parameters. At stage 642 the image is reconstructed and subject to deblocking filtering and Constrained Directional Enhancement Filtering (CDEF). The reconstructed image is then linearly upscaled at stage 644 to the super-resolution, in this example to a size of 4K×2K. Loop restoration filtering (e.g., a Wiener filter or a self-guided restoration filter) is applied at stage 646 to the upscaled reconstructed image using the loop restoration parameters that were determined based on the full resolution source image and encoded in the bitstream. The resulting loop restored image 650 may be used for inter-prediction of one or more subsequent images (e.g., frames of video).

Figure 7:
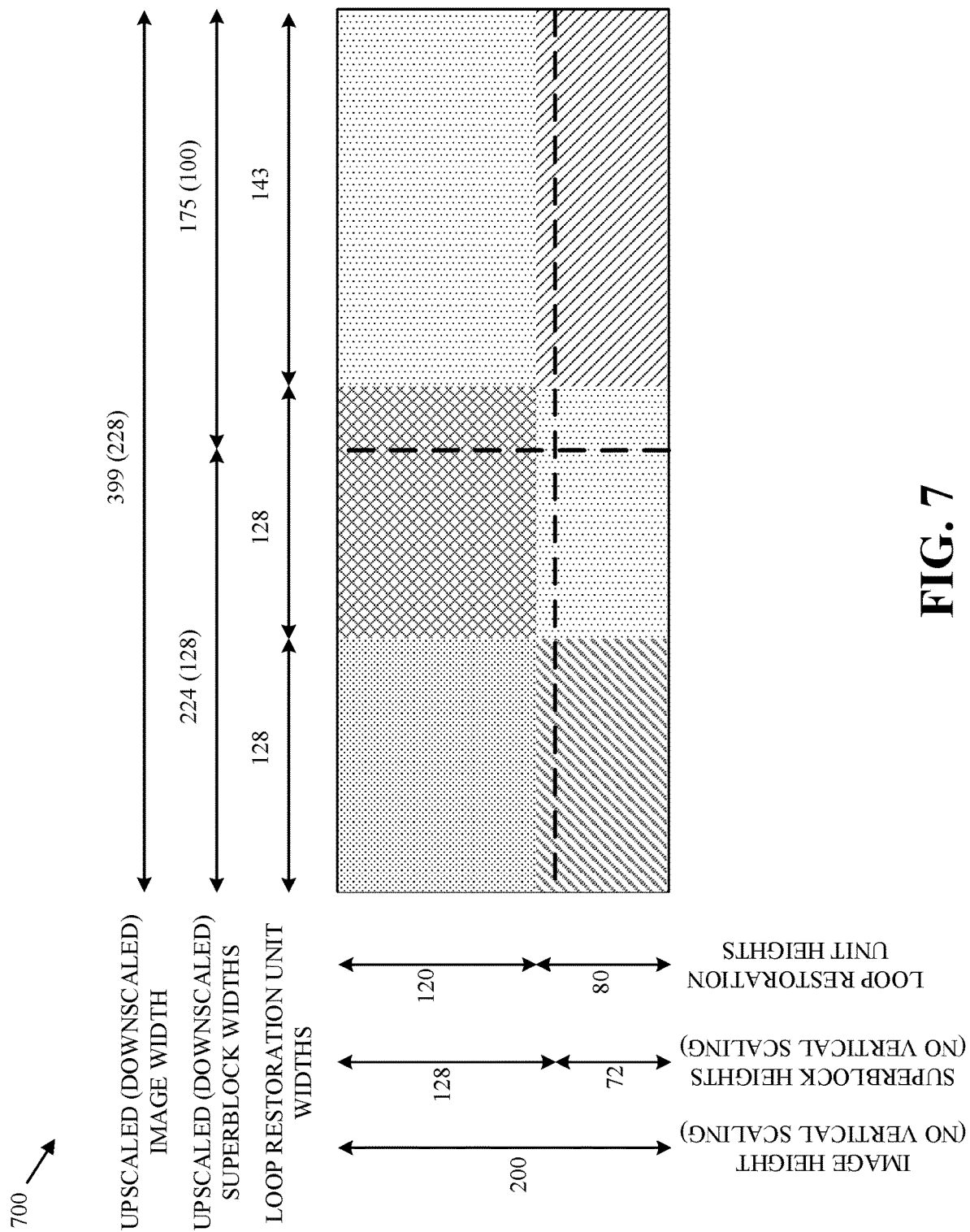
FIG. 7 is an illustration of an example of an image that is partitioned into blocks at an encoding resolution and loop restoration units at a super-resolution.

FIG. 7 is an illustration of an example of an image 700 that is partitioned into blocks at an encoding resolution and loop restoration units at a super-resolution. In some implementations, an image may be downscaled and encoded at a lower size, then be upscaled by the decoder just before loop restoration is applied. For example, an encoder may apply sharpening operations as part of loop restoration to reduce blurriness that would normally come from the upscale. For example, the downscaling performed by the encoder may be applied in a horizontal dimension, and may rescale by a factor of 8/(9+d) where d is an integer between 0 and 7, scaling down by a factor in range up to two. The smaller (e.g., lower resolution) image may be divided into blocks (e.g., tiles and/or superblocks) and encoded as normal, however the loop restoration units may partition the larger (e.g., higher resolution) image, after upscaling. This may affect how loop restoration unit coefficients are sent in the encoded bitstream. For example, the coefficients for a loop restoration unit may be sent with the block (e.g., the superblock) that contains its top-left corner. This mapping between loop restoration units and encoding blocks may take scaling into account. In some implementations, blocks (e.g., superblocks) have widths that are a multiple of 8 and the conversion for resolution may be imagined as upscaling the blocks and checking to see which of the upscaled blocks contain the top-left corners of loop restoration units. In some implementations, multiple loop restoration units are associated with a single block.

FIG. 7 shows how this might work with a 399×200 image 700, encoded with a super-resolution scale of 8/14 applied in a horizontal dimension and a block size and nominal loop restoration unit size of 128×128. The downscaled image is then 228×200 and will be divided into four blocks (e.g., superblocks) in two rows (of heights 128 and 72) and two columns (of widths 128 and 100). The blocks are demarcated by the dashed lines overlaid on the image 700. The loop restoration units are illustrated by the pattern fill rectangles in the image 700. The upscaled image is divided into six loop restoration units in two rows and three columns. The rows have heights 120 (128 shifted by 8 for a stripe offset) and 80. The columns have widths 128, 128 and 143 (rounded up because the last column would otherwise have had a width of 15, which is less than 128/2). The four left-most loop restoration units have their top-left corners in the top-left block after upscaling, so their respective loop restoration parameters (e.g., loop restoration filter coefficients) will appear in the bitstream just before its partition information. The other two loop restoration units have their top-left corners in the top-right block, so their respective loop restoration parameters will appear in the bitstream just before top-right block's partition information.

Figure 8:
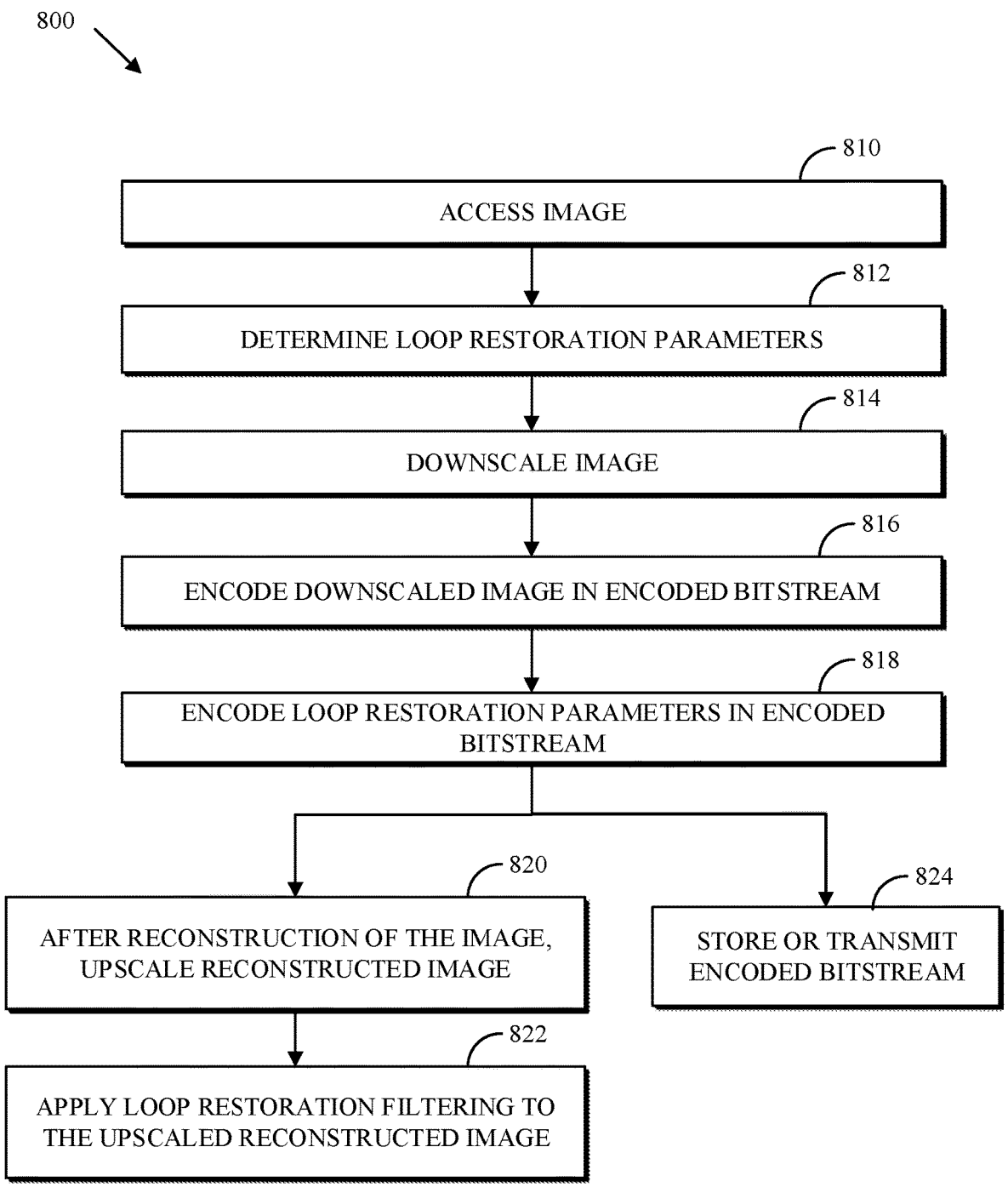
FIG. 8 is a flowchart of an example of a process for encoding images using super-resolution loop restoration.

FIG. 8 is a flowchart of an example of a process 800 for encoding images using super-resolution loop restoration. The process 800 includes accessing 810 an image at a first resolution; determining 812 loop restoration parameters based on the image; downscaling 814 the image to obtain a downscaled image at a second resolution; encoding 816 the downscaled image in an encoded bitstream; encoding 818 the loop restoration parameters in the encoded bitstream; after reconstruction of the image at the second resolution based on data of the encoded bitstream, upscaling 820 the reconstructed image to obtain an upscaled reconstructed image at the first resolution; applying 822 loop restoration filtering to the upscaled reconstructed image using the loop restoration parameters; and storing or transmitting 824 the encoded bitstream. For example, the process 800 may be implemented using a memory and a processor, wherein the memory stores instructions executable by the processor. For example, the process 800 may be implemented by the computing device 200 of FIG. 2. For example, the process 800 may be implemented by the transmitting station 102 of FIG. 1. For example, the process 800 may be implemented by the encoder 400 of FIG. 4.

The process 800 includes accessing 810 an image (e.g., a frame of video or a still image) at a first resolution. In some implementations, the first resolution is a full resolution, a source resolution, and/or a super-resolution. The image may be accessed 810 in variety of ways. For example, the image may be accessed 810 by reading directly from an image sensor (e.g., of the image-sensing device 220) or from a memory (e.g., the memory 204 or the secondary storage 214) via an interconnect (e.g., via the bus 212). For example, the image may be accessed 810 by receiving image data via a communications link (e.g., a wireless communications link).

The process 800 includes determining 812 loop restoration parameters based on the image. The loop restoration parameters (e.g., coefficients of a loop restoration filter) may be determined 812 based on the image at the first resolution in order in take account of information in the high resolution version of the image, before it is downscaled for encoding. For example, the loop restoration parameters may include a filter type selection (e.g., a Wiener filter, a self-guided loop restoration filter, or no filtering) for a unit of image data (e.g., an image, a color plane of an image, or a loop restoration unit). For example, the loop restoration parameters may include filter coefficients of a Wiener filter that are applicable to one or more loop restoration units of the image. For example, the loop restoration parameters may include filter coefficients of a self-guided loop restoration filter that are applicable to one or more loop restoration units of the image.

The process 800 includes downscaling 814 the image to obtain a downscaled image at a second resolution (e.g., an encode resolution). The second resolution may be less than the first resolution in at least one dimension. For example, the image may be downscaled in two dimensions. In some implementations, the image is downscaled only in a horizontal dimension. For example, downscaling in only the horizontal dimension may simplify hardware of an encoder by avoiding the used of extra line buffers. In some implementations, the image is downscaled only in a vertical dimension.

The process 800 includes encoding 816 the downscaled image in an encoded bitstream. For example, the downscaled image may be partitioned into blocks and subject to intra-prediction and/or inter-prediction coding, transform coding of residual blocks, quantization of transform coefficients, and/or entropy encoding of quantized transform coefficients. For example, the downscaled image may be encoded as described in relation to the encoder 400 of FIG. 4. For example, the resulting encoded bitstream may have a format similar to the compressed bitstream 420.

The process 800 includes encoding 818 the loop restoration parameters in the encoded bitstream. For example, the loop restoration parameters (e.g., filter type indications and/or filter coefficients) may be subject to entropy coding (e.g., using the entropy encoding stage 408 of FIG. 4). For example, the loop restoration parameters may be associated with loop restoration units of the image and the downscaled image may be partitioned into blocks for encoding. In some implementations, a mapping between coordinates of a loop restoration unit at a first resolution (e.g., a full resolution and/or a super-resolution) and coordinates of a block (e.g., a super-block or tile) at a second resolution (e.g., an encode resolution) is determined in order to identify a block associated with a loop restoration unit and encode 818 the loop restoration parameters associated with the loop restoration unit in the encoded bitstream at a portion corresponding to a block. For example, the process 1000 of FIG. 10 may be implemented to encode 818 the loop restoration parameters.

For example, a portion of the encoded bitstream corresponding to the image (e.g., a frame of video) may contain a few bits indicating what type of loop restoration is being used, then portions of the encoded bitstream corresponding to loop restoration units on one or more color planes of the image may indicate how loop restoration should be done for respective loop restoration units of the image. In some implementations, frame-level bits first signal the loop restoration mode for a plane of the frame. For example, the mode may be RESTORE_NONE, RESTORE_WIENER, RESTORE_SGRPROJ or RESTORE_SWITCHABLE. In the RESTORE_NONE case, the loop restoration pass may be completely disabled for that plane. In the RESTORE_WIENER and RESTORE_SGRPROJ cases, each restoration unit may indicate whether the filter is enabled and, if so, the coefficients to use. Finally, in the RESTORE_SWITCHABLE case, a restoration unit may indicate a restoration type (e.g., none, Wiener, or self-guided) and then the coefficients for that filter.

If any plane of the image has loop restoration enabled, frame-level bits may also signal the size of a loop-restoration unit. For example, in a luma plane, the size of a loop restoration unit may be 256×256, 128×128 or 64×64 samples. Where there is no subsampling, the chroma planes may have the same size loop restoration units as the luma plane. If there is subsampling in both directions, the chroma planes may either have the same size in samples or may have both dimensions reduced (e.g., halved). In some implementations, because a chroma sample may cover the same area of the image as a 2×2 block of luma samples, in the first case a chroma loop restoration unit may cover the same area of the image as four luma loop restoration units. In the second case, a chroma loop restoration unit may cover the same area of the image as one luma loop restoration unit. The bits describing loop restoration for the loop restoration units themselves may be interspersed with the main bulk of the image data in the encoded bitstream. For example, an individual loop restoration unit may have its coefficients signaled just before the partition information for a block (e.g., a superblock) containing its top-left corner.

For example, the encoded bitstream may include, after an image (e.g., a frame) width and height fields: a 1-bit flag to indicate if this image uses super-resolution mode; and, if super-resolution is used, another 3-bit value transmitted (ranging from 0 to 7), indicating a denominator of a scale factor from 9 through 16.

The process 800 includes, after reconstruction of the image at the second resolution (e.g., an encode resolution) based on data of the encoded bitstream, upscaling 820 the reconstructed image to obtain an upscaled reconstructed image at the first resolution (e.g., a full source resolution and/or a super-resolution). For example, reconstruction of the image may be performed as described in relation to the reconstruction stage 414 of FIG. 4. In some implementations, the reconstructed image is upscaled 820 in only a horizontal dimension. In some implementations, the reconstructed image is upscaled 820 in only a vertical dimension. In some implementations, the reconstructed image is upscaled 820 in two dimensions. For example, upscaling 820 the reconstructed image may include applying a linear up-scaler. An example, of a linear up-scaler is:

```
const int16_t av1_resize_filter_normative[64][8] = {
    { 0, 0, 0, 128, 0, 0, 0, 0 },        { 0, 0, -1, 128, 2, -1, 0, 0 },
    { 0, 1, -3, 127, 4, -2, 1, 0 },      { 0, 1, -4, 127, 6, -3, 1, 0 },
    { 0, 2, -6, 126, 8, -3, 1, 0 },      { 0, 2, -7, 125, 11, -4, 1, 0 },
    { -1, 2, -8, 125, 13, -5, 2, 0 },    { -1, 3, -9, 124, 15, -6, 2, 0 },
    { -1, 3, -10, 123, 18, -6, 2, -1 },  { -1, 3, -11, 122, 20, -7, 3, -1 },
    { -1, 4, -12, 121, 22, -8, 3, -1 },  { -1, 4, -13, 120, 25, -9, 3, -1 },
    { -1, 4, -14, 118, 28, -9, 3, -1 },  { -1, 4, -15, 117, 30, -10, 4, -1 },
    { -1, 5, -16, 116, 32, -11, 4, -1 }, { -1, 5, -16, 114, 35, -12, 4, -1 },
    { -1, 5, -17, 112, 38, -12, 4, -1 }, { -1, 5, -18, 111, 40, -13, 5, -1 },
    { -1, 5, -18, 109, 43, -14, 5, -1 }, { -1, 6, -19, 107, 45, -14, 5, -1 },
    { -1, 6, -19, 105, 48, -15, 5, -1 }, { -1, 6, -19, 103, 51, -16, 5, -1 },
    { -1, 6, -20, 101, 53, -16, 6, -1 }, { -1, 6, -20, 99, 56, -17, 6, -1 },
    { -1, 6, -20, 97, 58, -17, 6, -1 },  { -1, 6, -20, 95, 61, -18, 6, -1 },
    { -2, 7, -20, 93, 64, -18, 6, -2 },  { -2, 7, -20, 91, 66, -19, 6, -1 },
    { -2, 7, -20, 88, 69, -19, 6, -1 },  { -2, 7, -20, 86, 71, -19, 6, -1 },
    { -2, 7, -20, 84, 74, -20, 7, -2 },  { -2, 7, -20, 81, 76, -20, 7, -1 },
    { -2, 7, -20, 79, 79, -20, 7, -2 },  { -1, 7, -20, 76, 81, -20, 7, -2 },
    { -2, 7, -20, 74, 84, -20, 7, -2 },  { -1, 6, -19, 71, 86, -20, 7, -2 },
    { -1, 6, -19, 69, 88, -20, 7, -2 },  { -1, 6, -19, 66, 91, -20, 7, -2 },
    { -2, 6, -18, 64, 93, -20, 7, -2 },  { -1, 6, -18, 61, 95, -20, 6, -1 },
    { -1, 6, -17, 58, 97, -20, 6, -1 },  { -1, 6, -17, 56, 99, -20, 6, -1 },
    { -1, 6, -16, 53, 101, -20, 6, -1 }, { -1, 5, -16, 51, 103, -19, 6, -1 },
    { -1, 5, -15, 48, 105, -19, 6, -1 }, { -1, 5, -14, 45, 107, -19, 6, -1 },
    { -1, 5, -14, 43, 109, -18, 5, -1 }, { -1, 5, -13, 40, 111, -18, 5, -1 },
```

-continued

```
    { -1, 4, -12, 38, 112, -17, 5, -1 },           { -1, 4, -12, 35, 114, -16, 5, -1 },
    { -1, 4, -11, 32, 116, -16, 5, -1 },           { -1, 4, -10, 30, 117, -15, 4, -1 },
    { -1, 3, -9, 28, 118, -14, 4, -1 },            { -1, 3, -9, 25, 120, -13, 4, -1 },
    { -1, 3, -8, 22, 121, -12, 4, -1 },            { -1, 3, -7, 20, 122, -11, 3, -1 },
    { -1, 2, -6, 18, 123, -10, 3, -1 },            { 0, 2, -6, 15, 124, -9, 3, -1 },
    { 0, 2, -5, 13, 125, -8, 2, -1 },              { 0, 1, -4, 11, 125, -7, 2, 0 },
    { 0, 1, -3, 8, 126, -6, 2, 0 },                {0, 1, -3, 6, 127, -4, 1, 0 },
  { 0, 1, -2, 4, 127, -3, 1, 0 },                { 0, 0, -1, 2, 128, -1, 0, 0 }
}                                              // [Code Segment 1]
```

The process 800 includes applying 822 loop restoration filtering to the upscaled reconstructed image using the loop restoration parameters. For example, applying 822 the loop restoration filtering may include Weiner filtering using the loop restoration parameters (e.g., including Wiener filter coefficients applicable to one or more loop restoration units). For example, applying 822 the loop restoration filtering may include self-guided filtering using the loop restoration parameters (e.g., including self-guided filter coefficients applicable to one or more loop restoration units). For example, a resulting loop restored image may be used for inter-prediction coding of one or more subsequent images (e.g., frames of video).

The process 800 includes storing or transmitting 824 the encoded bitstream. For example, the encoded bitstream may be stored 824 in the secondary storage 214 or the memory 204. For example, the encoded bitstream may be transmitted 824 via a network interface from the transmitting station 102, through the network 104, to the receiving station 106.

Figure 9:
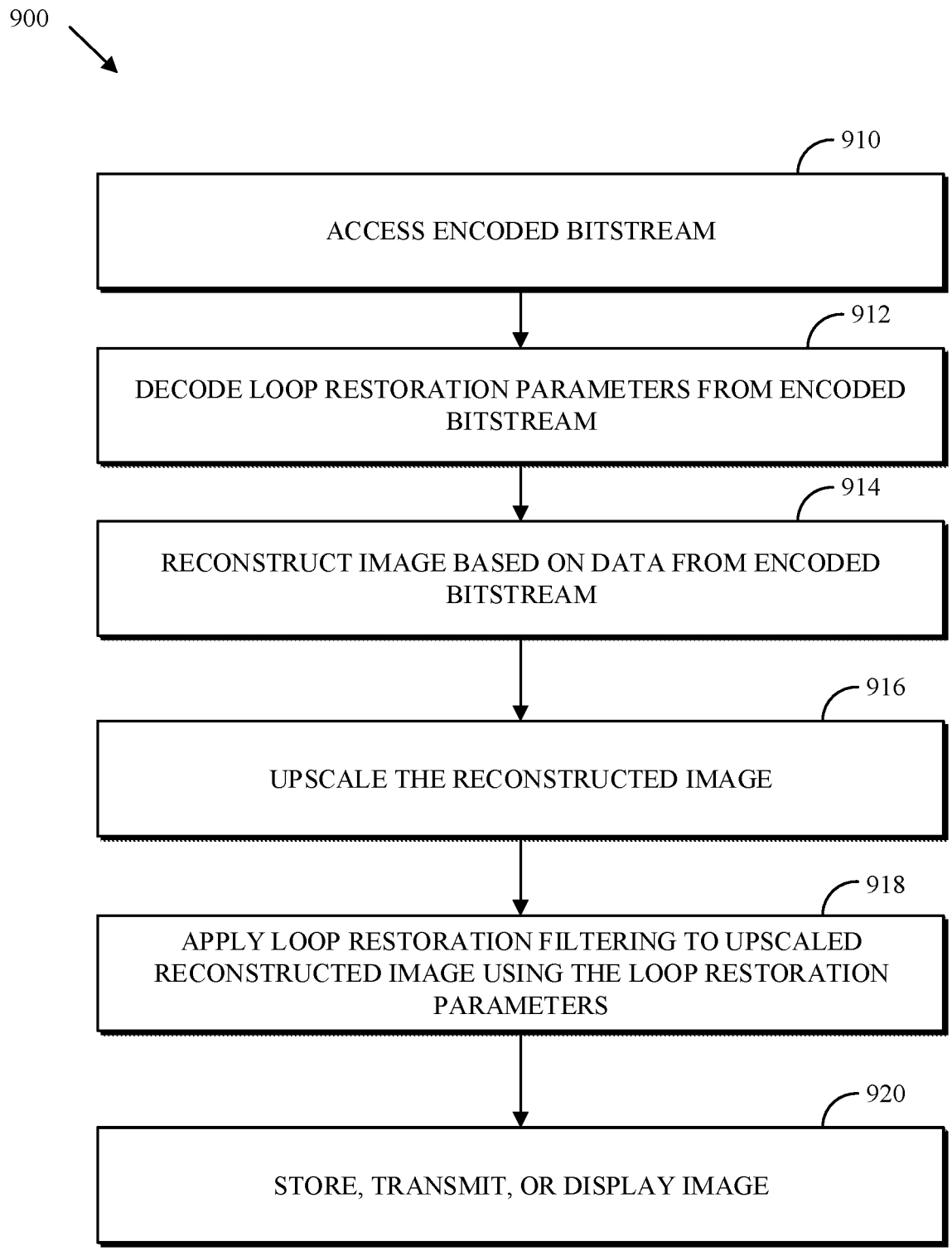
FIG. 9 is a flowchart of an example of a process for decoding images using super-resolution loop restoration.

FIG. 9 is a flowchart of an example of a process 900 for decoding images using super-resolution loop restoration. The process 900 includes accessing 910 an encoded bitstream; decoding 912 loop restoration parameters in the encoded bitstream; reconstruction 914 of an image based on data of the encoded bitstream; upscaling 916 the reconstructed image to obtain an upscaled reconstructed image at a first resolution (e.g., a super-resolution); applying 918 loop restoration filtering to the upscaled reconstructed image using the loop restoration parameters to obtain a loop restored image at the first resolution; and storing, transmitting, or displaying 920 an image based on the loop restored image. For example, the process 900 may be implemented using a memory and a processor, wherein the memory stores instructions executable by the processor. For example, the process 900 may be implemented by the computing device 200 of FIG. 2. For example, the process 900 may be implemented by the receiving station 106 of FIG. 1. For example, the process 900 may be implemented by the decoder 500 of FIG. 5.

The process 900 includes accessing 910 an encoded bitstream (e.g., the compressed bitstream 420). The bitstream may be accessed 910 in variety of ways. For example, the bitstream may be accessed 910 by reading from a memory (e.g., the memory 204 or the secondary storage 214) via an interconnect (e.g., via the bus 212). For example, the bitstream may be accessed 910 by receiving image data via a communications link (e.g., a wireless communications link).

The process 900 includes decoding 912 loop restoration parameters in the encoded bitstream. For example, the loop restoration parameters may include a filter type selection (e.g., a Wiener filter, a self-guided loop restoration filter, or no filtering) for a unit of image data (e.g., an image, a color plane of an image, or a loop restoration unit). For example, the loop restoration parameters may include filter coefficients of a Wiener filter that are applicable to one or more loop restoration units of the image. For example, the loop restoration parameters may include filter coefficients of a self-guided loop restoration filter that are applicable to one or more loop restoration units of the image. For example, the loop restoration parameters (e.g., filter type indications and/or filter coefficients) may be retrieved using entropy decoding (e.g., using the entropy decoding stage 502 of FIG. 5). For example, the loop restoration parameters may be associated with loop restoration units of an image and the image may have been partitioned into blocks for encoding in the encoded bitstream. In some implementations, a mapping between coordinates of a loop restoration unit at a first resolution (e.g., a full resolution and/or a super-resolution) and coordinates of a block (e.g., a super-block or tile) at a second resolution (e.g., an encode resolution) is determined in order to identify a block associated with a loop restoration unit and decode 912 the loop restoration parameters associated with the loop restoration unit in the encoded bitstream at a portion corresponding to a block. For example, the process 1100 of FIG. 11 may be implemented to decode 912 the loop restoration parameters.

The process 900 includes reconstructing 914 an image (e.g., a frame of video or a still image) at the second resolution (e.g., an encode resolution) based on data of the encoded bitstream. For example, the image may be reconstructed 914 using techniques described in relation to the decoder 500 of FIG. 5, including techniques described in relation to the reconstruction stage 510.

The process 900 includes after reconstruction of an image at the second resolution (e.g., an encode resolution) based on data of the encoded bitstream, upscaling 916 the reconstructed image to obtain an upscaled reconstructed image at the first resolution (e.g., a full resolution and/or a super-resolution). The second resolution may be less than the first resolution in at least one dimension. In some implementations, the reconstructed image is upscaled 916 in only a horizontal dimension. In some implementations, the reconstructed image is upscaled 916 in only a vertical dimension. In some implementations, the reconstructed image is upscaled 916 in two dimensions. For example, upscaling 916 the reconstructed image may include applying a linear up-scaler. An example of a linear up-scaler that may be used is described in Code Segment 1 above.

The process 900 includes applying 918 loop restoration filtering to the upscaled reconstructed image using the loop restoration parameters to obtain a loop restored image at the first resolution (e.g., a full resolution and/or a super-resolution). For example, applying 918 the loop restoration filtering may include Weiner filtering using the loop restoration parameters (e.g., including Wiener filter coefficients applicable to one or more loop restoration units). For example, applying 918 the loop restoration filtering may include self-guided filtering using the loop restoration parameters (e.g., including self-guided filter coefficients applicable to one or more loop restoration units). For example, a resulting loop restored image may be used for inter-prediction coding of one or more subsequent images (e.g., frames of video).

The process 900 includes storing, transmitting, or displaying 920 an image (e.g., a frame of video or a still image) based on the loop restored image. For example, the image may be identical to the loop restored image or the image may result from subsequent image processing (e.g., reformatting to fit a particular display format by changing an aspect ratio) applied to the loop restored image. For example, the image may be stored 920 in the secondary storage 214 or the memory 204. For example, the image may be transmitted 920 via a network interface from the receiving station 106 through the network 104. For example, the image may be displayed 920 in the display 218.

Figure 10:
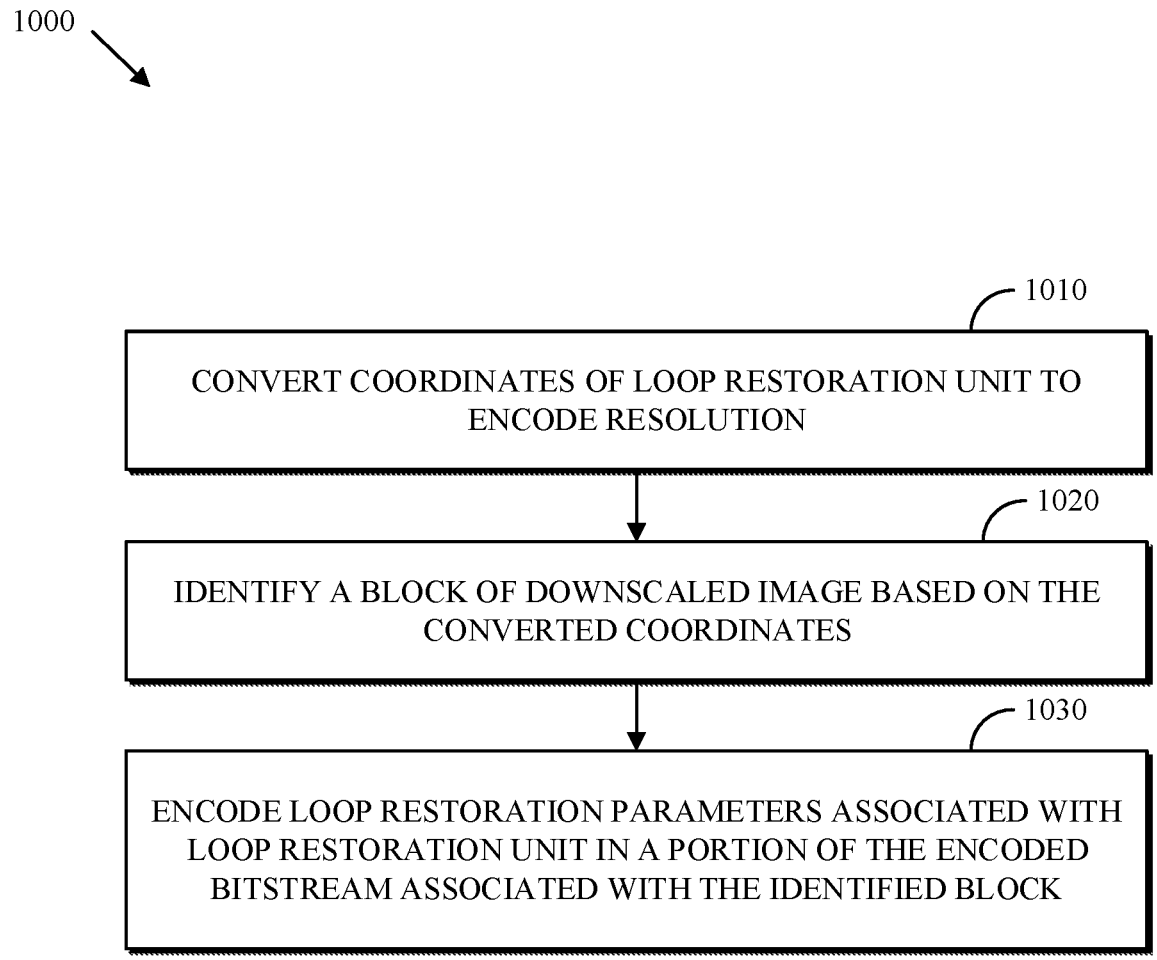
FIG. 10 is a flowchart of an example of a process for mapping from super-resolution loop restoration units to a block based encoding of a bitstream.

FIG. 10 is a flowchart of an example of a process 1000 for mapping from super-resolution loop restoration units to a block based encoding of a bitstream. For example, loop restoration parameters may be associated with loop restoration units of the image and a downscaled image may be partitioned into blocks for encoding. The process 1000 includes converting 1010 coordinates associated with a loop restoration unit to coordinates in a reconstructed image at an encode resolution; identifying 1020 a block of the downscaled image based on the converted coordinates; and encoding 1030 loop restoration parameters associated with the loop restoration unit in a portion of the encoded bitstream associated with the identified block. For example, the process 1000 may be implemented using a memory and a processor, wherein the memory stores instructions executable by the processor. For example, the process 1000 may be implemented by the computing device 200 of FIG. 2. For example, the process 1000 may be implemented by the transmitting station 102 of FIG. 1. For example, the process 1000 may be implemented by the encoder 400 of FIG. 4.

As can be seen from the framework 600 of FIG. 6, the loop restoration parameters are transmitted per block at a lower resolution (e.g., an encode resolution), but the loop-restoration is actually applied at a higher resolution after upscaling. Thus an implied mapping of the loop restoration parameters from the lower resolution to the upscaled resolution may be used to encode the loop restoration parameters in appropriate portion of an encoded bitstream. For example, the mapping may works as follows: Suppose (in the upscaled domain) the top-left corner of a loop restoration unit has the coordinates (w, h). Then, the corresponding location in the low resolution (e.g., encode resolution) domain is (w', h')=(w*8/(9+d), h), where d is an integer between 0 and 7. Now identify 1020 a block (e.g., a superblock) in the low resolution domain that the location (w', h') belongs to. Use loop restoration parameters corresponding to the identified block for applying loop restoration filtering to the loop restoration unit.

The process 1000 includes converting 1010 coordinates in the image at the first resolution (e.g., a full resolution and/or a super-resolution) associated with a loop restoration unit to coordinates in the reconstructed image at the second resolution (e.g., an encode resolution). In some implementations, the coordinates correspond to an upper left corner of the loop restoration unit. For example, the coordinates may be converted by multiplying one or more components of the coordinates by a scaling factor for a respective dimension. For example, a horizontal component of the coordinates may be multiplied by a horizontal scale factor (e.g., 8/(9+d), where d is an integer between 0 and 7) and/or a vertical component of the coordinates may be multiplied by a vertical scale factor (e.g., 8/(9+d), where d is an integer between 0 and 7) to determine the converted coordinates.

The process 1000 includes identifying 1020 a block of the downscaled image based on the converted coordinates. For example, a block (e.g., a superblock or a tile) of the downscaled image that includes the converted coordinates may be identified 1020.

The process 1000 includes encoding 1030 loop restoration parameters associated with the loop restoration unit in a portion of the encoded bitstream associated with the identified block. For example, the loop restoration parameters (e.g., filter type indications and/or filter coefficients) may be subject to entropy coding (e.g., using the entropy encoding stage 408 of FIG. 4). In some implementations, data from the encoded bitstream associated with one of the blocks includes loop restoration parameters for multiple loop restoration units.

Figure 11:
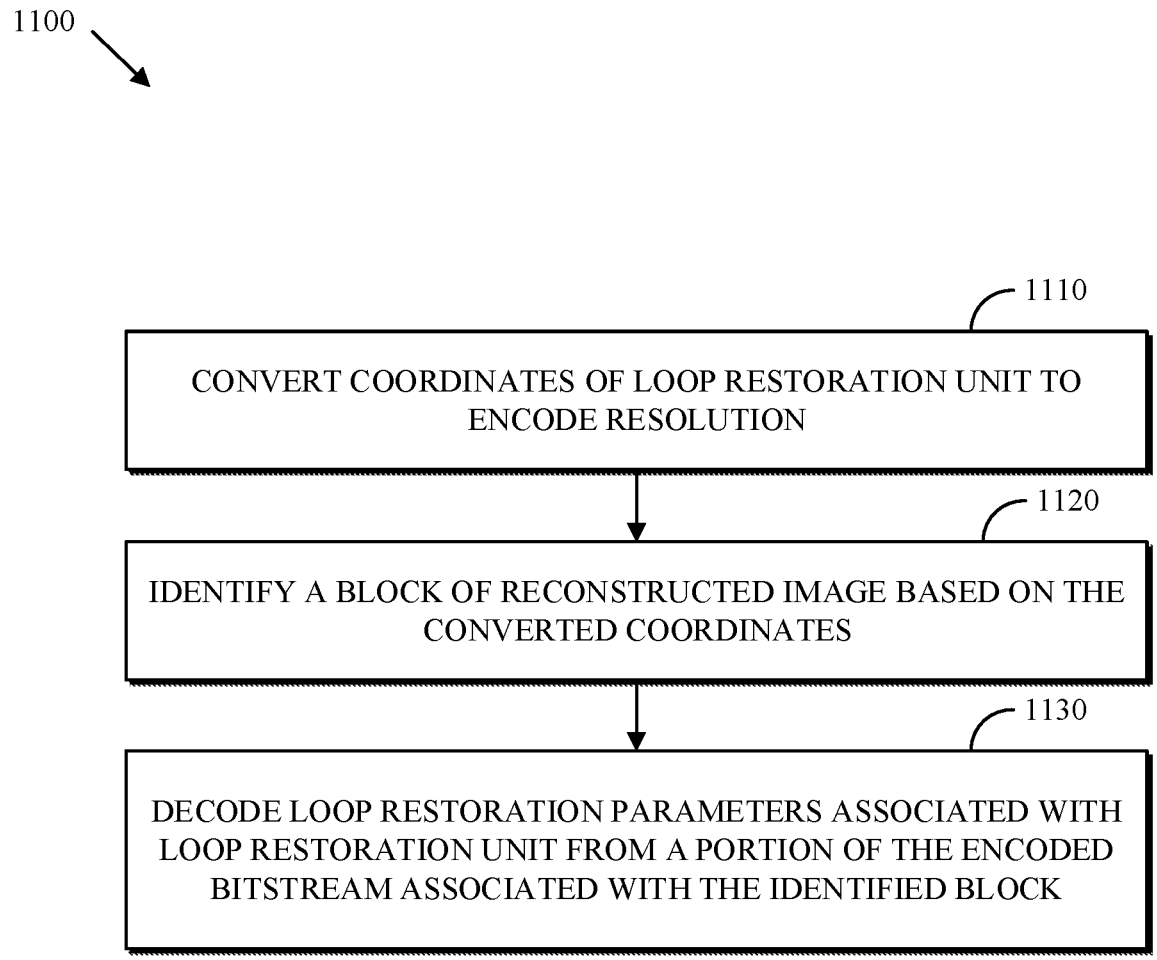
FIG. 11 is a flowchart of an example of a process for mapping from a block based encoding of a bitstream to super-resolution loop restoration units.

FIG. 11 is a flowchart of an example of a process 1100 for mapping from a block based encoding of a bitstream to super-resolution loop restoration units. For example, loop restoration parameters may be associated with loop restoration units of the upscaled reconstructed image at a first resolution (e.g., a full resolution and/or a super-resolution) and the reconstructed image may be partitioned into blocks at a second resolution (e.g., an encode resolution). The process 1000 includes converting 1110 coordinates in the upscaled reconstructed image associated with a loop restoration unit to coordinates in the reconstructed image; identifying 1120 a block of the reconstructed image based on the converted coordinates; and decoding 1130 loop restoration parameters associated with the loop restoration unit from a portion of the encoded bitstream associated with the identified block. For example, the process 1100 may be implemented using a memory and a processor, wherein the memory stores instructions executable by the processor. For example, the process 1100 may be implemented by the computing device 200 of FIG. 2. For example, the process 1100 may be implemented by the receiving station 106 of FIG. 1. For example, the process 1100 may be implemented by the decoder 500 of FIG. 5.

The process 1100 includes converting 1110 coordinates in the upscaled reconstructed image at the first resolution (e.g., a full resolution and/or a super-resolution) associated with a loop restoration unit to coordinates in the reconstructed image at the second resolution (e.g., an encode resolution). In some implementations, the coordinates correspond to an upper left corner of the loop restoration unit. For example, the coordinates may be converted by multiplying one or more components of the coordinates by a scaling factor for a respective dimension. For example, a horizontal component of the coordinates may be multiplied by a horizontal scale factor (e.g., 8/(9+d), where d is an integer between 0 and 7) and/or a vertical component of the coordinates may be multiplied by a vertical scale factor (e.g., 8/(9+d), where d is an integer between 0 and 7) to determine the converted coordinates.

The process 1100 includes identifying 1120 a block of the reconstructed image based on the converted coordinates. For example, a block (e.g., a superblock or a tile) of the reconstructed image that includes the converted coordinates may be identified 1020.

The process 1100 includes decoding 1130 loop restoration parameters associated with the loop restoration unit from a portion of the encoded bitstream associated with the identified block. For example, the loop restoration parameters (e.g., filter type indications and/or filter coefficients) may be retrieved using entropy decoding (e.g., using the entropy decoding stage 502 of FIG. 5). In some implementations, data from the encoded bitstream associated with one of the blocks includes loop restoration parameters for multiple loop restoration units.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/ processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A system for encoding video, comprising:
a processor configured to:
    access an image at a first resolution;
    determine loop restoration parameters based on the image, wherein the loop restoration parameters are associated with loop restoration units of the image;
    downscale the image to obtain a downscaled image at a second resolution, wherein the second resolution is less than the first resolution in at least one dimension;
    encode the downscaled image in an encoded bitstream, wherein the downscaled image is partitioned into blocks for encoding;
    encode the loop restoration parameters in the encoded bitstream, wherein the loop restoration parameters are associated with loop restoration units of the image;
    reconstruct the image at the second resolution from the encoded downscaled image;
    convert coordinates in the image at the first resolution associated with a loop restoration unit of the loop restoration units to coordinates in the reconstructed image at the second resolution; and
    identify a block of the downscaled image based on the converted coordinates, wherein to encode the loop restoration parameters comprises to encode the loop restoration parameters associated with the loop restoration unit in a portion of the encoded bitstream associated with the identified block.

2. The system of claim 1, wherein the processor is configured to:
    upscale the reconstructed image in only a horizontal dimension to obtain an upscaled reconstructed image at the first resolution; and
    apply loop restoration filtering to the upscaled reconstructed image at the first resolution.

3. The system of claim 1, wherein the coordinates correspond to an upper left corner of the loop restoration unit.

4. The system of claim 1, wherein data from the encoded bitstream associated with one of the blocks includes loop restoration parameters for multiple loop restoration units.

5. The system of claim 1, wherein the processor is configured to:
upscale the reconstructed image by applying a linear up-scaler to obtain an upscaled reconstructed image at the first resolution; and
apply loop restoration filtering to the upscaled reconstructed image at the first resolution.

6. The system of claim 2, wherein to apply the loop restoration filtering comprises to apply Weiner filtering using the loop restoration parameters.

7. The system of claim 1, wherein the processor is configured to:
store or transmit the encoded bitstream.

8. A method for decoding video comprising:
accessing an encoded bitstream;
decoding, from the encoded bitstream, a flag indicating whether an image was encoded using a super-resolution mode;
decoding, responsive to the flag indicating that the image was encoded using a super-resolution mode, bits signaling an amount of downscaling of the image from a first resolution to a second resolution, wherein the second resolution is less than the first resolution in at least one dimension and the amount of downscaling is variable;
decoding loop restoration parameters in the encoded bitstream;
reconstructing the image at the second resolution based on data of the encoded bitstream to obtain a reconstructed image;
upscaling the reconstructed image at the second resolution to obtain an upscaled reconstructed image at the first resolution; and
applying loop restoration filtering to the upscaled reconstructed image using the loop restoration parameters to obtain a loop restored image at the first resolution.

9. The method of claim 8, wherein the reconstructed image is upscaled in only a horizontal dimension.

10. The method of claim 8, wherein the loop restoration parameters are associated with loop restoration units of the upscaled reconstructed image at the first resolution and the reconstructed image is partitioned into blocks at the second resolution, the method further comprising:
converting coordinates in the upscaled reconstructed image at the first resolution associated with a loop restoration unit to coordinates in the reconstructed image at the second resolution; and
identifying a block of the reconstructed image based on the converted coordinates, wherein decoding the loop restoration parameters comprises:
decoding loop restoration parameters associated with the loop restoration unit from a portion of the encoded bitstream associated with the identified block.

11. The method of claim 8, comprising:
storing, transmitting, or displaying an image based on the loop restored image.

12. A system for decoding video, comprising:
a processor configured to:
access an encoded bitstream;
decode loop restoration parameters in the encoded bitstream;
reconstruct an image at a second resolution based on data of the encoded bitstream, wherein the reconstructed image is partitioned into blocks at the second resolution;
upscale the reconstructed image to obtain an upscaled reconstructed image at a first resolution, wherein the second resolution is less than the first resolution in at least one dimension, and the loop restoration parameters are associated with loop restoration units of the upscaled reconstructed image at the first resolution;
convert coordinates in the upscaled reconstructed image at the first resolution associated with a loop restoration unit of the loop restoration units to coordinates in the reconstructed image at the second resolution;
identify a block of the reconstructed image based on the converted coordinates; and
apply loop restoration filtering to the upscaled reconstructed image using the loop restoration parameters to obtain a loop restored image at the first resolution, wherein to decode the loop restoration parameters comprises to decode loop restoration parameters associated with the loop restoration unit from a portion of the encoded bitstream associated with the identified block.

13. The system of claim 12, wherein the reconstructed image is upscaled in only a horizontal dimension.

14. The system of claim 12, wherein the coordinates correspond to an upper left corner of the loop restoration unit.

15. The system of claim 12, wherein data from the encoded bitstream associated with one of the blocks includes loop restoration parameters for multiple loop restoration units.

16. The system of claim 12, wherein the processor is configured to:
upscale the reconstructed image by applying a linear up-scaler.

17. The system of claim 12, wherein to apply the loop restoration filtering includes applying Weiner filtering using the loop restoration parameters.

18. The system of claim 12, wherein the processor is configured to:
store, transmit, or display an image based on the loop restored image.

19. The system of claim 12, wherein to apply the loop restoration filtering comprises to apply the loop restoration parameters associated with the loop restoration unit to the block of the reconstructed image as upscaled within the upscaled reconstructed image.

20. The system of claim 1, wherein the processor is configured to:
encode, in the encoded bitstream, a flag indicating that the image was encoded using a super-resolution mode; and
encode, in the encoded bitstream, bits signaling an amount of downscaling of the image from the first resolution to the second resolution, wherein the amount of downscaling is variable.

* * * * *